United States Patent [19]
Holland

[11] Patent Number: 5,908,558
[45] Date of Patent: Jun. 1, 1999

[54] METHOD AND APPARATUS FOR REMOVING CONTAMINANTS FROM FLUID COLUMNS

[76] Inventor: Herbert W. Holland, 2314 Chimney Rock, Houston, Tex. 77056

[21] Appl. No.: 08/733,395

[22] Filed: Oct. 18, 1996

[51] Int. Cl.[6] .................................................. B01D 15/04
[52] U.S. Cl. .......................... 210/692; 210/694; 210/266; 210/282; 210/283; 210/284; 210/337; 210/492; 210/502.1; 210/799; 210/924; 210/925; 210/DIG. 5
[58] Field of Search .................................. 210/282, 283, 210/284, 266, 290, 688, 690, 691, 692, 693, 694, 799, 502.1, 337, 492, 924, 925, DIG. 5

[56] References Cited

U.S. PATENT DOCUMENTS

| 4,005,010 | 1/1977 | Lunt ......................................... 210/150 |
| 4,111,813 | 9/1978 | Preus ........................................ 210/282 |
| 4,534,865 | 8/1985 | Sundberg et al. ....................... 210/284 |
| 5,324,429 | 6/1994 | Holland .................................... 210/484 |
| 5,374,600 | 12/1994 | Hozumi et al. .......................... 502/402 |
| 5,462,785 | 10/1995 | Holland .................................... 210/924 |
| 5,588,785 | 12/1996 | Holland .................................... 210/924 |
| 5,662,801 | 9/1997 | Holland .................................... 210/266 |

*Primary Examiner*—Robert J. Popovics

[57] ABSTRACT

A method and apparatus for removal of contaminants from fluid columns utilizes a solidifying polymer-based filtration media to extract pollutants, such as organic compounds and metals. Dissolved, emulsified or suspended contaminants are absorbed and solidified into an easily retrievable mass and retained within a replaceable filter container. Solidified contaminants may not leach when exposed to pressure limits currently used to determine landfill acceptability, may be incinerated as fuel for their BTU content or used as a component in the production of asphalt, roofing material or other tar-like compounds. Treated fluid columns exit the process containing acceptable levels of contaminants to permit free release into the environment.

53 Claims, 8 Drawing Sheets

METHOD AND APPARATUS FOR REMOVING CONTAMINANTS FROM FLUID COLUMNS

BACKGROUND OF THE INVENTION

The present invention relates to the removal of contaminants from fluid columns.

Most common methods of managing polluted fluid columns rely on sorbent devices comprised of non-woven fabric materials, such as polypropylene, or filtration systems utilizing activated carbon to remove contaminants from feed streams. In many instances, these methods of dealing with pollutants merely result in contaminants being transferred to a different location where they must once again be processed for disposal.

Use of sorbent devices is messy, labor intensive and time consuming. The transportation and proper disposal of non-woven textile sorbent devices containing contaminants present additional problems. In many instances, non-woven textile devices saturated with pollutants may be placed in a landfill where only a small amount of pressure can release contaminants from the sorbent devices. The free release of pollutants into a landfill facility accomplishes little more than converting fluid borne contaminants into land contaminants, making this option an ineffective means of dealing with polluted feed streams.

When utilizing activated carbon, contaminants in a feed stream coat the surface of the carbon with a glaze of the pollutants, reducing the sorptive capacity and the effectiveness of the carbon. This requires the carbon filtration media to be frequently replaced, increasing costs associated with extracting contaminants from the feed stream and generating a large volume of contaminated filtration media for processing and disposal. These prior art methods of dealing with contaminants in fluid columns are harmful to the environment in that the issue of proper disposal of free flowing contaminants remains.

Certain elastomer polymers have the capability of imbibing and solidifying contaminants. However, simply placing a bed of the polymer within a filtering container may result in a variety of deficiencies when attempting to utilize the polymer as a filtration media.

In U.S. Pat. No. 4,534,865, Sundberg teaches that when utilizing a cross-linked organic polymer as a filtration media, the flow of a feed stream through an absorption bed of polymer will be decreased, and ultimately terminated, by the swelling of the polymer material as it absorbs and retains contaminants passing through a container of cross-linked polymer.

Further, passing a feed stream through a container packed with solidifying polymer often results in an undesired channeling within the bed of polymer, especially at high flow rates and elevated operating pressures. As a feed stream forms irregular channels through a packed bed of polymer, tube-like passages comprised of a non-permeable, rubber-like material may form along the internal periphery of these channels as contaminants in the feed stream are imbibed and solidified by the polymer. High levels of contaminants may be discharged from a filtering container when a feed stream is encapsulated within the tube-like passages and segregated from that portion of the solidifying polymer still having a capacity for contaminant uptake.

Packaging the polymer material in an envelope of a non-woven textile material and randomly placing the polymer-filled devices within a filtering container may present similar problems of surface blockage and channeling. The problem of surface blockage may manifest itself once again as a layer of solidified contaminants may form just beneath the envelope of textile material that defines the overall shape of the device, sealing a significant amount of the polymer still having a capacity for contaminant uptake inside a layer of solidified contaminants.

Random placement of individual polymer-filled bags within a filtering container may further result in restricted flow and channeling due to the polymer-filled devices exhibiting an effect similar to that created by the use of sandbags as flood control devices. Loose polymer within a textile material envelope may shift and settle into cavities between surrounding polymer-filled devices, restricting the flow of the feed stream through the filtering container.

Further, as a feed stream passes through a filtering container packed with randomly placed polymer-filled bags, it may channel through only a portion of the container. Polymer-filled bags adjacent to these channels may absorb and solidify contaminants, then form solidified channels similar to the tube-like passages within a packed bed of solidifying polymer.

SUMMARY OF THE INVENTION

In accordance with the present invention, a method and apparatus for removing contaminants, such as organic compounds and metals, from fluid columns, such as air or water, utilizes a solidifying elastomer polymer. As used herein, the term filter container means a vessel having a fluid impervious boundary wall with an outer surface and having a fluid inlet port and a fluid discharge port that allow a contaminated fluid column to enter the container and come in contact with a polymer-based filtration media so that fluid column may exit the vessel as a processed feed stream for release into the environment. A fluid column containing contaminants may be directed to pass through a filter container having stratified layers of a polymer-based filtration media arranged and sealed within the container. As a polluted fluid column passes through the filter container, free floating, suspended, dissolved and emulsified contaminants coming into contact with the polymer-based filtration media are sorbed, then solidified into a solid rubber-like mass. The contaminants may be retained within the filter container to facilitate their handling for disposal or recycling.

Replacement of spent filtration media requires the removal of a used filter container and replacing it with a container having a fresh supply of polymer-based filtration media capable of sorbing and solidifying contaminants.

In one example, the filter container may be configured as a stand alone unit with fittings and connections for placement in a filtration system. Replacement of spent filtration media requires uncoupling all fittings and connections of the filter container, then removing the used container from the system. It may then be replaced with a filter container having a fresh supply of polymer-based filtration media capable of sorbing and solidifying contaminants, then reconnecting all fittings required for operation of the system.

In another example, a filter container may be modified to serve as a replacement cartridge within a filter housing that may be mounted in a filtration system. Filter containers may be utilized in solitary filter housings, or may be configured for use as a replacement device for conventional coalescing or other filtration elements in existing separation systems. Replacement of spent filtration media requires opening the filter housing and removing the filter container. The spent filter container may be replaced with a container of fresh polymer-based filtration media having a capacity to absorb and solidify contaminants, then sealing the filter housing.

Once the filtration media has reached its capacity to sorb and solidify contaminants, the filter container provides a means of easy retrieval of consolidated contaminants for disposal or recycling options. As such, the solidified mass eliminates storage and mass transfer concerns associated with existing methods of dealing with contaminated fluids columns, substantially reducing capital and operating costs. Solidified contaminants may not leach when exposed to pressures currently used to determine landfill acceptability, or may be incinerated to capitalize on their excellent BTU content.

In particular configurations of the apparatus utilized in this method, the filter container, its internal components and the spent filtration media may be granulated, then utilized as a component in the production of asphalt, roofing material or other tar-like compounds, or incinerated as fuel pellets.

The present method may extract contaminants from a fluid column as they pass through a stratified arrangement of polymer-based filtration media, removing contaminants such as aliphatic hydrocarbons, aromatic hydrocarbons, chlorinated hydrocarbons, captions, esters, ethers, alcohols, other organic compounds and metals from the feed stream.

The solidifying polymer may be utilized to form a variety of embodiments of polymer-based filtration media. It may be sealed within individual bags, suspended within the fibers of a textile material to provide a solidifying fabric or stratified with a plurality of layers of a non-woven textile material and sealed within an outer envelope. An agglomeration of polymer and binding agents may be formed into disks or other useful configurations. Solidifying polymer may be blended with other types of absorbent, adsorbent or coalescing materials.

One embodiment of the polymer as a filtration media utilizes small individual polymer-filled bags. Each bag may be sealed to form a solitary chamber of solidifying polymer within a single layer envelope of textile material. The seaming of the textile material to seal the polymer inside the bags may be accomplished by several means including mechanical stitching, thermal sealing and ultra-sonic fusing. A measured amount of polymer may be placed within each bag so that the ratio of polymer to the surface area of the bag will provide for utilization of all the solidifying polymer sealed within the bag prior to the formation of a layer of surface blockage beneath the envelope of the bag.

Suspending the polymer within the fibers of a textile material may be accomplished by incorporating the polymer into the body of the fabric as the textile material is formed. This process is normally used in the production of melt-blown or spunbonded textiles. The manufacturing of a synthetic textile material starts with raw petrochemical based pellets, such as polypropylene, being blended with pigments and/or additives. This mixture is heated to the melting point of the pellets and extruded into filaments. The filaments are drawn and attenuated, using high velocity air to align the polymer molecules of the fabric and maximize fiber strength. The resulting continuous, high tenacity filaments are formed into a web on a moving conveyor screen and thermally fused with a bonding system to maximize the strength and surface stability of the fabric.

The solidifying polymer may be suspended within the fabric by adding it to the mix of raw petro-chemical based pellets, pigments and additives, melting the mixture and extruding filaments from the mixture. This method incorporates the polymer into the body of the filaments as they are formed.

Certain re-cycled plastics may be mixed with the pellets, pigments and additives used in the formation of the filaments of the textile material, eliminating them from landfills and utilizing the re-cycled components in an effective pollution control process.

The solidifying polymer may be suspended within the fabric by injecting a preferably evenly distributed amount of the polymer at an intermediate point on a web of filaments as they are formed on a conveyor screen. As the filaments are thermally fused by the bonding system, the polymer may be trapped within the layers of fused filaments, becoming a component of the finished textile fabric material.

The polymer may be suspended within pockets of a fabric by consolidating layers of textile material around measured amounts of polymer with a device having the capability of producing a pattern in the fused layers of textile material. A calendaring device is one example of an apparatus that may be utilized as a bonding mechanism; other means of consolidating the layers may be utilized. A pattern of preferably evenly distributed amounts of polymer may be placed on a layer of textile material filaments in a pattern corresponding to the pattern of the calendaring device. A second layer of textile material filaments may then be placed over the initial web of filaments supporting the pattern of evenly distributed amounts of polymer, prior to introducing the layers of textile material to the: calendaring device. As the filaments of the two layers of textile material are fused by the calendaring device, the pattern of evenly distributed amounts of polymer may be encased within the pockets created by the bonding device. The resulting chambers of polymer become a component of the finished solidifying fabric.

A preferably evenly distributed, measured amount of the polymer may be attached to the textile material by using an adhesive to bond the polymer to a layer of the textile material.

Individual polymer-filled bags, polymer suspended within pockets of a solidifying fabric, textile material with polymer incorporated into the body of its filaments, textile material holding polymer within its web of filaments, textile material bonded to the polymer or layers of polymer and textile material may be placed in a stratified arrangement and consolidated along their peripheries by a seamed joinder to provide polymer-filled devices. See U.S. Pat. Nos. 5,324,429, 5,458,773, 5,462,785, 5,518,797, 5,527,457 and U.S. patent application Ser. No. 08/506,091.

Surface blockage in these polymer-filled devices may be overcome by utilizing a stratified arrangement of layers of solidifying polymer and textile material. A seamed joinder may be used to consolidate the outer envelope and the internally stratified fabric layers of these devices. In some instances, it may be beneficial to include a plurality of quilting seams to further consolidate the stratified layers. Stratification allows for full utilization of the polymer within a packaged device by eliminating the problem of surface blockage below the envelope layer. As contaminants come in contact with a polymer-filled device, the seamed joinder along the periphery of the device and, if included, the quilting seams consolidating the internal stratified layers with the outer envelope, enhance to ability of the textile material portion of the device to dispersively conduct contaminants under capillary attraction throughout the interior of the device for absorption and solidification by the polymer portion of the device.

Solidifying polymer may be blended with absorbent, adsorbent or coalescing materials, such as activated carbon, coconut shell or plastic pellets, to provide a polymer-based filtration media. Similarly, an agglomeration of polymer and binding agents may be formed into disks or molded into a variety of other suitable configurations to produce a polymer-based filtration media.

As used herein, examples of a filtration media wherein at least one component is an elastomer polymer having a property of imbibing and solidifying contaminants that come in contact with the filtration media may be considered a polymer-based filtration media.

A similar stratification concept to the one successfully demonstrated to effectively overcome the issue of surface blockage in polymer-filled devices may be applied to the utilization of a variety of polymer-based filtration media for extracting contaminants from fluid columns.

Polymer-based filtration media may be arranged within a filter container to establish the necessary flow channels and consolidation points to provide for maximum surface area contact of the solidifying polymer with contaminants in a feed stream.

One arrangement results in a substantially coplanar array of the polymer-based devices, the devices establishing distinct chambers of contaminant absorbing and solidifying units. The polymer-based devices may be placed within a filter container in a uniform stratified arrangement which defines a plurality of consolidation points of the outer envelopes of the devices having a substantially equal surface area and creates a plurality of flow channels of substantially equal cross-sectional area.

Flow channels established throughout the uniform stratified arrangement of the coplanar array of polymer-based devices allow a feed stream to pass through the filter container without the previously encountered problems of flow restriction and surface blockage. Other uniform arrangements of polymer-based devices that allow a feed stream to flow through a filter container without restriction and surface blockage, including combining polymer-based devices with coalescing or other materials, may be utilized to provide a polymer-based filtration media.

The polymer suspended within the fibers of textile material may provide for a variety of embodiments of a polymer-based filtration media. In one configuration, a plurality of layers of the solidifying fabric may be arranged within a filter container in a parallel orientation to the direction of the flow of a feed stream through the container. Layers of solidifying fabric may be arranged to conform to the internal geometric configuration and dimensions of the filter container so that each successive internal layer of solidifying fabric may be circumscribed by an adjacent outer layer of fabric. Such a configuration of multiple layers of solidifying fabric, when viewed from one end of a cylindrically shaped filtering apparatus, would resemble a series of concentric circles. Layers of coalescing material may be placed between the layers of solidifying fabric.

To provide increased surface area, the solidifying fabric may be folded and arranged in an accordion-like configuration. These pleated sheets may be arranged to conform to the internal geometric configuration and dimensions of a filter container.

In another example, a length of solidifying fabric may be covered by a corresponding length of coalescing material, such as a lattice-like arrangement of polyethylene, and rolled into a cylinder. The resulting spiral arrangement of alternate layers of coalescing mesh material and solidifying fabric, similar to the previously disclosed arrangement of layers of solidifying fabric with each successive layer circumscribing an adjacent smaller layer, serves to provide maximum surface area contact of contaminants in the fluid column with the solidifying fabric.

As used herein, an arrangement of solidifying fabric that provides for migration of contaminants under capillary attraction throughout layers of solidifying fabric and establishes flow channels that inhibit formation of a layer of surface blockage may be considered to be a nested array of solidifying fabric.

Various embodiments of polymer-based filtration media may be placed in a filter container to utilize the stratification concept successfully demonstrated to effectively overcome the issue of surface blockage in polymer-filled devices.

Stratification of polymer-based filtration media within a filter container may establish flow channels and consolidation points for maximum surface area contact of the solidifying polymer with contaminants in a feed stream, and allow the entire amount of the polymer within a filter container to be utilized by inhibiting the formation of a layer of surface blockage.

Stratification may be achieved by utilizing layers of coalescing material and open-spaced chambers between the layers of polymer-based filtration media. Layers of coalescing material, such as nylon, polypropylene, polyester or polyethylene, provide small contaminant droplets in a fluid column with a means of cohesively bonding into larger droplets that are more readily sorbed and solidified by the polymer-based filtration media. Open-spaced layers allow further consolidation of contaminant particles within a feed stream, prior to their passage through subsequent layers of polymer-based filtration media. Further, open-spaced consolidation chambers, and some forms of coalescing layers, allow for expansion and an increase in volume of the polymer-based filtration media as it imbibes and solidifies contaminants coming into contact with it.

Coalescing layers may be formed from a wide range of materials including polypropylene pellets or pads of synthetic fibers, such as nylon and polyester, in an open textured, non-woven construction. Other means and materials may be employed to coalesce small contaminant droplets into larger, more easily recoverable contaminant droplets.

Each layer of the polymer-based filtration media establishes a distinct chamber for absorbing and solidifying contaminants and affords a contaminated fluid column passing through a filter container with a multiplicity of contact points with the polymer. Stratified layers further serve to impede the channeling of a fluid column as it passes through a filter container.

Stratification of the polymer-based filtration media, coalescing material and open-spaced consolidation chambers provides for a uniform distribution of the solidifying polymer for maximum surface contact and retention time of contaminants in a feed stream with the distinct units of polymer-based filtration media for absorption and solidification. Uniform distribution of the solidifying polymer further provides for the uniform expansion of the solidifying polymer as it imbibes and solidifies contaminants.

The contamination level of a fluid column may be gradually diluted as a feed stream passes through each layer of polymer-based filtration media. The present method provides for the multi-phase treatment of a fluid column within a filter container. Treated feed streams may be discharged from a filter container completely free of pollutants; or a fluid column may contain substantially lower concentrations of contaminants and be acceptable for release into the environment.

BRIEF DESCRIPTION OF THE DRAWINGS

The accompanying drawings illustrate the preferred embodiments of the invention in which.

DESCRIPTION OF THE PREFERRED EMBODIMENT

Pretreatment of a feed stream, utilizing gravity, skimming, centrifugal, stripping, coalescing or other separation methods, to extract any readily recoverable pollutants may be desirable to collect the contaminants for recycling or other uses. Reducing the level of contaminants in a feed stream prior to passing it through a filter container further serves to prolong the life of the polymer-based filtration media, thereby increasing its efficiency in removing contaminants from a fluid column. Loose particles and suspended solids, such as dirt, dust, rust, soot or other debris may clog a filter container and should be extracted from a fluid column prior to passing it through a filter container.

Contaminants remaining in a feed stream may be extracted from a fluid column as they pass through stratified layers of polymer-based filtration media. The polymer-based filtration media may be configured to prevent surface blockage, allowing a fluid column to pass through a filter container after the filtration media has reached its capacity for contaminant uptake. When a layer of polymer-based filtration media reaches its limit for absorption and solidification of contaminants, it may continue to serve as an additional coalescing layer within a filter container to provide cohesive consolidation of contaminants within a feed stream to form larger droplets that are more readily extracted by subsequent layers of polymer-based filtration media.

The method may best be used to treat fluid columns containing relatively low level concentrations of contaminants. Composition of contaminants, level of concentration of pollutants and length of time a feed stream is exposed to the solidifying polymer, along with ambient temperature and configuration of components utilized in the process, are critical factors in determining the rate of absorption and the amount of time required to solidify the broad spectrum of contaminants the present method is designed to extract from fluid columns.

To enhance the interaction of the solidifying polymer with pollutants in the feed stream, the present method utilizes the layering of a solidifying polymer-based filtration media, coalescing material and open-spaced fluid consolidation chambers to form a stratified arrangement within a filter container.

Monitoring a fluid column may be desired to confirm the treated feed stream is acceptable for release into the environment. In the event a fluid column may require additional treatment, it may be reprocessed until acceptable discharge limits are attained.

Figure 1:
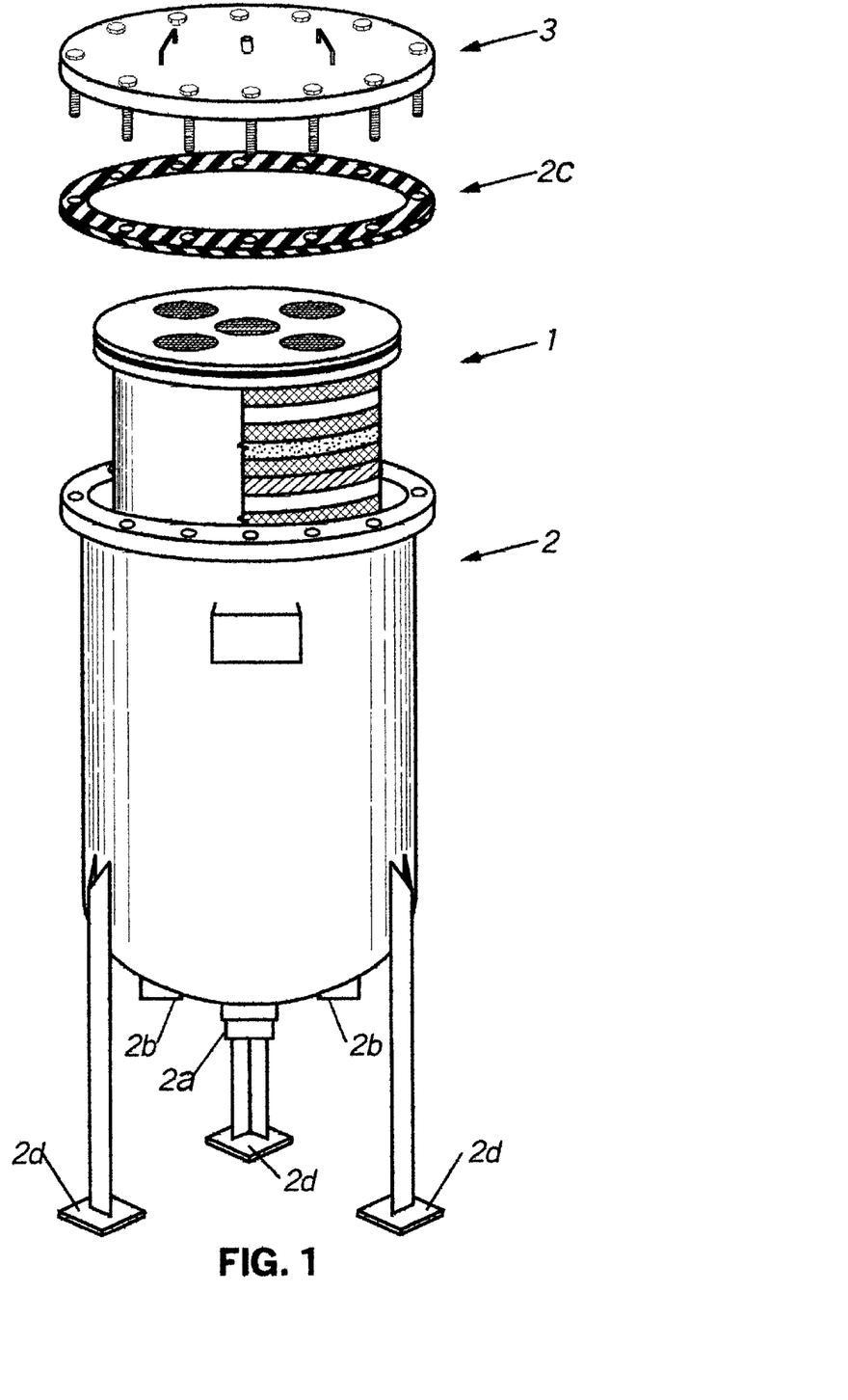
FIG. 1 is an exploded illustration of a replaceable filter container within a filter housing.

In FIG. 1, an apparatus is illustrated that provides for the removal of contaminants found in fluid columns. Filter container 1 is shown within filter housing 2. Structural supports 2d at the base of the filter housing provide access to inlet and outlet ports 2a and 2b. A contaminated feed stream may be directed to enter filter housing 2 at port 2a at the center of the base of the filter housing, where it may then enter filter container 1 for treatment. Once the feed stream has passed through the filter container, it is retained within the filter housing and directed to one of the outer ports 2b for release into the environment, or for additional treatment.

Bracing members may be placed between the inner wall of a filter container and the outer wall of a filter housing to maintain the alignment of the components during shipping and handling. Such supporting segments that allow a feed stream to pass between the inner wall of a filter housing and the outer wall of a filter container with minimal restriction of flow may further serve to stabilize a filter container within a filter housing and provide consistent alignment of the components during the operation of the unit.

In certain applications, it may be advantageous to reverse the direction of the flow of the feed stream through the filter container. In these instances, a feed stream may be directed to enter filter housing 2 through one of the outer ports 2b. Once the feed stream has filled the cavity between the inner wall of the filter housing and the outer wall of the filter container, it may enter filter container 1 for treatment. After the feed stream has passed through the filter container, it may be directed to port 2a for discharge into the environment, or for additional treatment.

Access to filter container 1, mounted within filter housing 2, may be gained by removing filter housing lid 3. Gasket 2c may be utilized when sealing filter housing lid 3 to filter housing 2 to prevent leakage of the feed stream into the environment.

Figure 2:
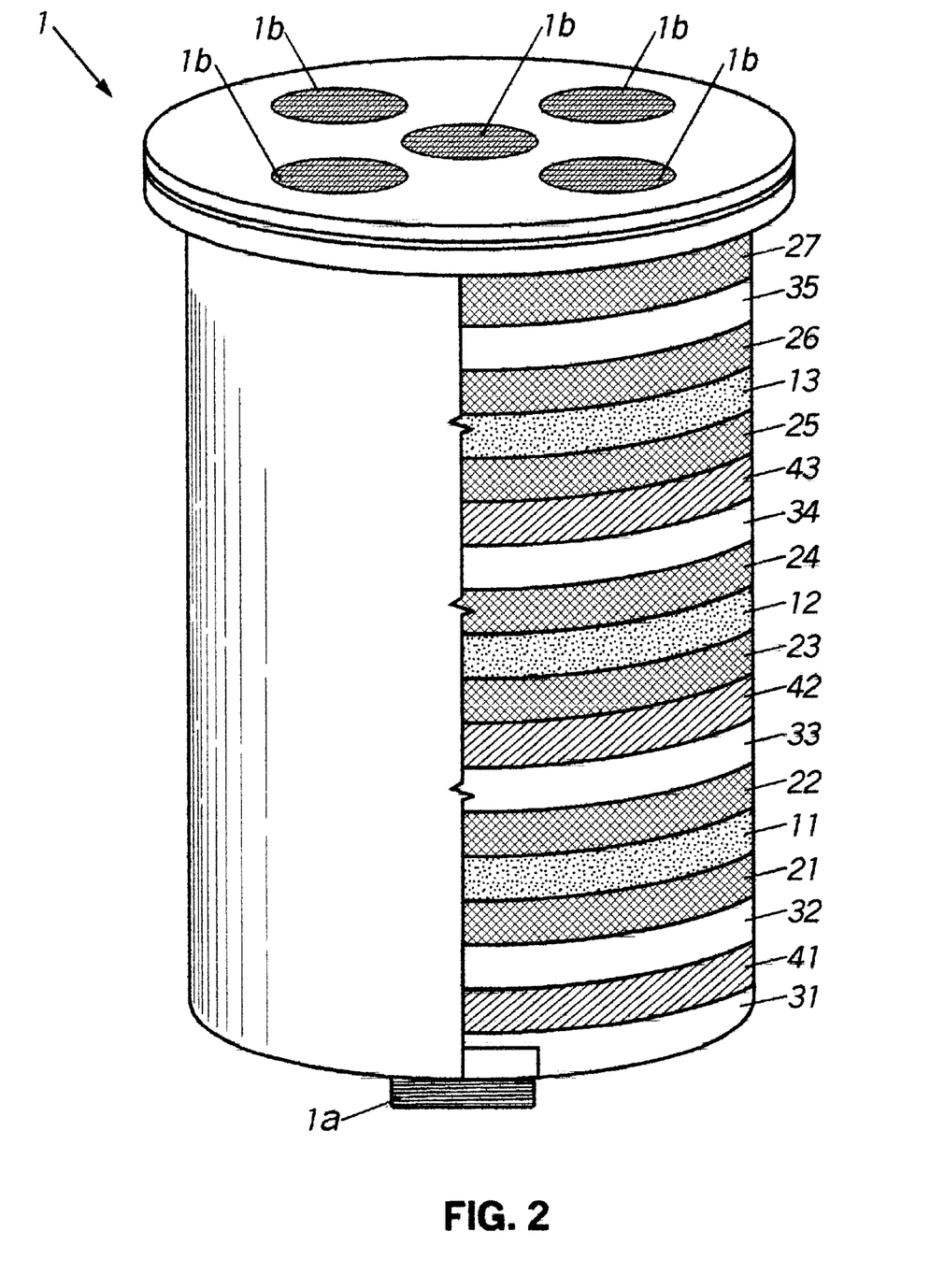
FIG. 2 shows a cross section of a stratified arrangement of filtration media within a filter container.

FIG. 2 is a cross-sectional view of a filter container. Within filter container 1 is a stratified arrangement of polymer-based filtration media 11, 12 and 13, coalescing material 21, 22, 23, 24, 25, 26 and 27 and open-spaced fluid consolidation chambers 31, 32, 33, 34 and 35. A feed stream may enter filter container 1 at port 1a via a connection to port 2a of the filter housing, pass through the stratified layers within filter container and be discharged through ports 1b. A fluid column discharged from ports 1b may pass between the outer wall of the filter container and the inner wall of the filter housing for discharge from the filter housing at ports 2b. In certain applications, the direction of flow of a fluid column through the filter container may be reversed.

The placement of a layer of polymer-based filtration media 12 between coalescing layers 23 and 24 creates a series of continuous consolidation points along the planes where the distinct layers intersect. This stratified arrangement presents a feed stream with a significant amount of surface area exposure to the evenly distributed polymer-based filtration media as it passes through a filter container. Contaminants in a feed stream are provided numerous contact points with the solidifying polymer for absorption and solidification, removing them from the feed stream.

Structural stabilizing segments 41, 42 and 43 may be utilized in the stratified arrangement to assist in maintaining the alignment of the stratified layers within a filter container by arranging them in a substantially perpendicular orientation to the direction of flow through the filter container. The segments may be sized to conform to the internal dimensions of a filter container and may be made of a material similar to that comprising the container. A pattern of perforations incorporated in each of the structural stabilizing segments allows a feed stream to pass through the filter container with minimal flow restriction.

Utilization of such structural stabilizing segments provides for an even distribution and equitable surface area exposure of a feed stream to the layers of polymer-based filtration media. These segments maintain the alignment of the coalescing layers and open-spaced consolidation chambers with the layers of polymer-based filtration media during shipping and handling. Consistent alignment of the stratified layers within a filter container provides for the uniform expansion of the solidifying polymer as it imbibes and solidifies contaminants. Uniform expansion of the solidifying polymer allows a feed stream to pass through the stratified arrangement within a filter container while inhibiting the formation of a layer of surface blockage.

To enhance the present method, perforations may be configured so that the aperture on the side of a structural stabilizing segment initially making contact with a feed stream may have a greater diameter than the orifice on the discharge side of the structural stabilizing segment. Utilizing such conical-shaped perforations in a structural stabilizing segment may provide small contaminant droplets in a fluid column with a means of coming in contact with, and cohesively bonding to, other small contaminant droplets to form larger droplets that are more readily sorbed and solidified by the polymer-based filtration media.

In many instances, it may be beneficial to weld or bond a structural stabilizing segment to the internal wall of a filter container, or the cavity between the structural stabilizing segment and the internal wall of the filter container may be sealed with a gasket or other means.

Fusing the surfaces or sealing the cavities between the structural stabilizing segments and the internal wall of a filter container prevents migration of a fluid column along the internal wall of the filter container. Polymer-filled devices, solidifying textile material, an agglomeration of solidifying polymer and binding agents or other materials may be formed into a gasket or other suitable configurations to seal the cavities between the structural stabilizing segments and the internal wall of the filter container.

Figure 1A:
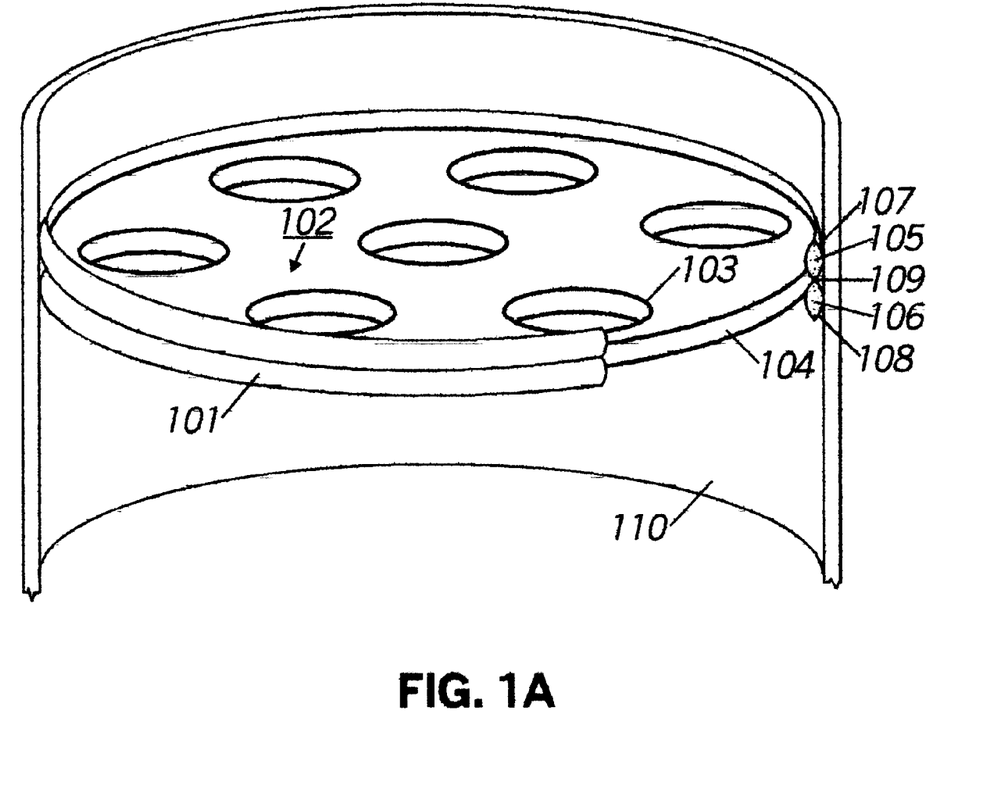
FIG. 1A is an illustration of a polymer-filled gasket circumscribing a perforated structural stabilizing segment.

One example of such a gasket may be comprised of distinct chambers of solidifying polymer within tubular columns of textile material aligned in substantial registration with each other. As shown in FIG. 1A, tubular columns of textile material may be stratified and joined along their peripheries to form a gasket 101. A polymer-filled gasket may be aligned with a structural stabilizing segment 102 so that the outer edge of the structural stabilizing segment 104 abuts the stratified tubular columns of solidifying polymer 107 and 108 along the seam 109 that consolidates the stratified columns.

When a structural stabilizing segment circumscribed by such a polymer-filled gasket is placed within a filter container, the stratified tubular columns of the gasket serve to seal the cavity between the inner wall of the filter container 110 and the periphery of the structural stabilizing segment 104. The flow of a fluid column through the filter container may then be directed to a pattern of perforations 103 in the structural stabilizing segment for an even distribution and equitable surface area exposure to subsequent layers of polymer-based filtration media.

As contaminants come in contact with the gasket, the distinct chambers of polymer 105 and 106 may begin to expand as they imbibe and solidify pollutants. Expansion of the polymer may allow the gasket to further conform to variations in the space between the inner wall of the container and the structural stabilizing segment, thereby improving the effectiveness of the seal between the two surfaces. Such gaskets may further serve to define the outer periphery of an open-spaced fluid consolidation chamber on either side of a structural stabilizing segment and assist in maintaining the alignment of the adjacent stratified layers.

Figure 2A:
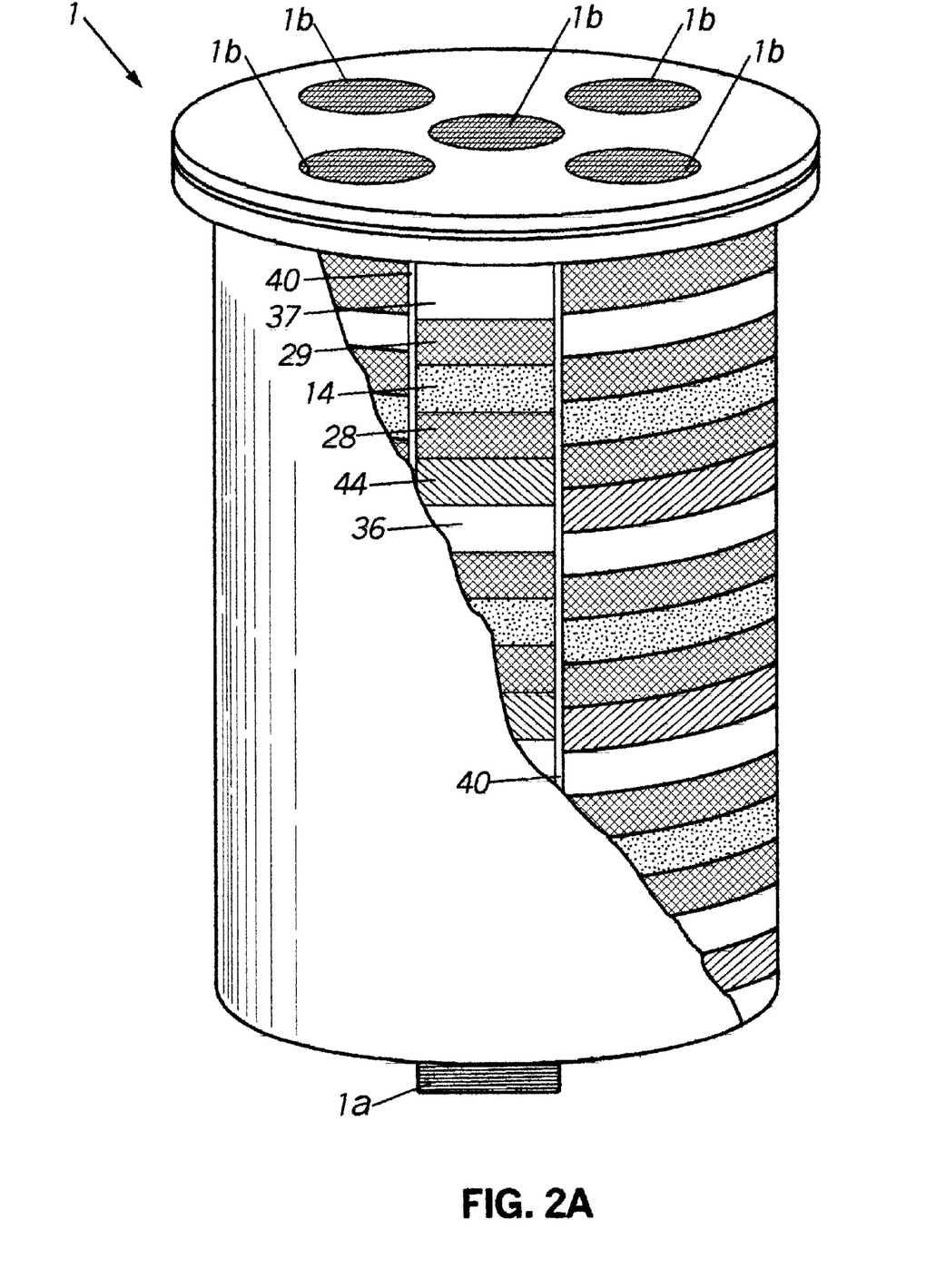
FIG. 2A shows a cross section of a stratified arrangement of filtration media within a filter container circumscribing an internal structural stabilizing column.

Additional modification to the stratified design may prove to be advantageous in augmenting the structural stability of a filter container. In FIG. 2A, a cross-sectional view of an apparatus for conducting a method of extracting contaminants from fluid columns shows a stratified arrangement of polymer-based filtration media, coalescing material and open-spaced consolidation chambers circumscribing an internal column 40 that may be included for additional structural stability. An internal structural stabilizing column may be placed within a filter container in a substantially parallel orientation to the direction of flow through the container.

In instances where the internal structural stabilizing column is of a tubular configuration, the interior of the column may be utilized for additional filtration capacity. In a configuration of a filter container where both the inlet and outlet ports are located on the same end of the device, the tubular column may be utilized as a conduit to direct a feed stream to the opposite end of the container either prior to, or after, passing the fluid column through the polymer-based filtration media.

FIG. 2A shows a stratified arrangement of polymer-based filtration media 14, coalescing material 28 and 29, open-spaced fluid consolidation chambers 36 and 37 and structural stabilizing segment 44 within internal tubular column 40. A fluid column may enter the tubular column at one end, pass through the stratified layers and be discharged from the opposite end of the column. Other arrangements of the polymer-based filtration media may be utilized within an internal tubular column.

A fluid column entering a filter container may be directed to pass through the stratified layers between the inner wall of the filter container and the outer wall of an internal column. It may also be directed to pass through an internal tubular column. The feed stream may then be discharged from the filter container.

Structural stabilizing segments in the filter container may be attached to the inner wall of the filter container, the outer wall of an internal column or to both surfaces to assist in maintaining the alignment of the stratified layers within the container. The cavities between the structural stabilizing segments and the inner wall of the filter container or the outer wall of an internal column may be sealed to assist in maintaining the alignment of the stratified layers within the container. Structural stabilizing segments, if utilized, may be attached to the inner wall of an internal tubular column. Cavities between the structural stabilizing segments and the inner wall of an internal tubular column may be sealed.

Figure 3:
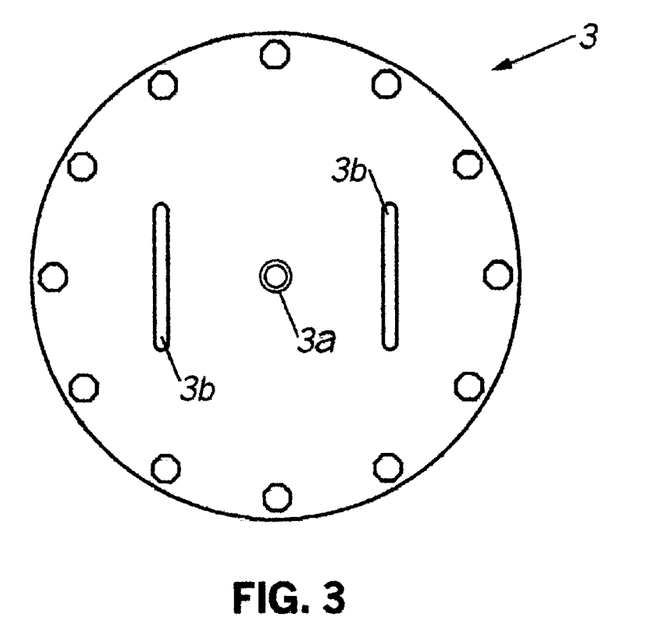
FIG. 3 shows a top view of a filter housing lid.

In FIG. 3, the top of filter housing lid 3 is shown. Handles 3b are provided to facilitate handling the lid. Port 3a may be utilized for connection of devices such as pressure gauges or ventilation valves, or may be plugged.

Figure 4:
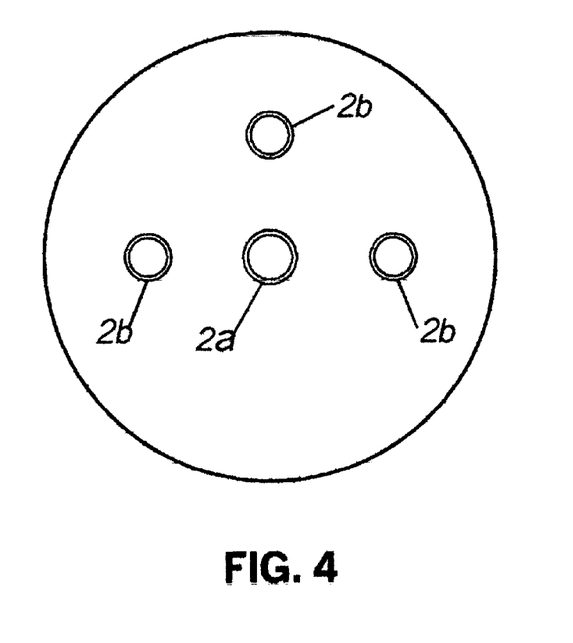
FIG. 4 shows a bottom view of a filter housing.

FIG. 4 shows the location of port 2a and ports 2b on the bottom of a filter housing.

Stratification of layers of distinct contaminant absorbing and solidifying units within a filter container provides for maximum surface area contact of a feed stream with the polymer-based filtration media. The result is a greater retention time of free floating, suspended, dissolved or emulsified contaminants with the solidifying polymer for absorption and solidification.

Figure 5:
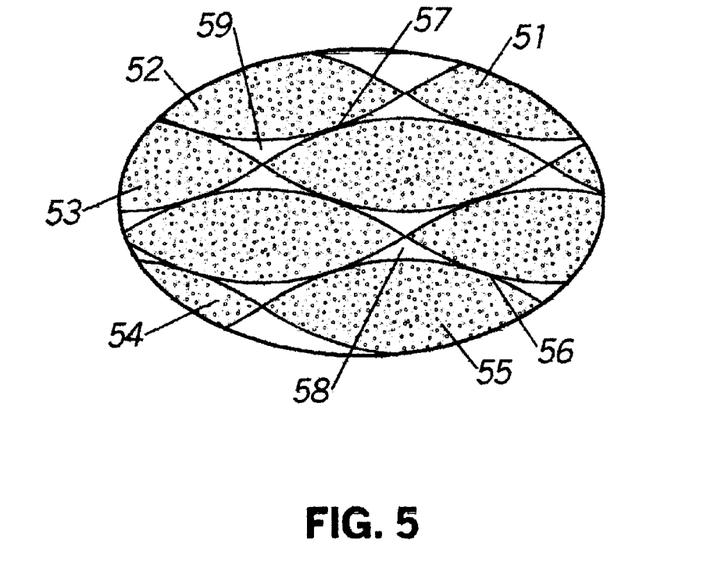
FIG. 5 shows a plurality of polymer-filled devices placed in a substantially coplanar stratified arrangement to provide a layer of polymer-based filtration media within a filter container.

The properties of non-woven textile materials that allow for the rapid absorption and migration of a variety of contaminants effectively gives the method a means of providing maximum surface area exposure of the solidifying polymer to contaminants. As shown in FIG. 5, a plurality of polymer-filled devices 51, 52, 53, 54 and 55 may be placed in a substantially coplanar stratified arrangement to provide a layer of polymer-based filtration media within a filter container. Each device may be comprised of a plurality of layers of solidifying polymer and non-woven textile material, with a seamed joinder along the periphery of the polymer-filled device. In some instances, the internal layers of textile material and the outer envelope may be further consolidated by a pattern of quilting seams placed on, or parallel to, the longitudinal and/or lateral axes of the polymer-filled device. Other patterns of seams may be utilized to consolidate the stratified layers.

The coplanar stratified arrangement creates a plurality of consolidation points of substantially equal surface area 56 and 57 of the stratified array of polymer-filled devices and creates a series of flow channels of substantially equal cross-sectional area 58 and 59. These flow channels, located in areas where the polymer-filled devices do not come in contact with each other, allow a feed stream to pass through the stratified arrangement and serve to inhibit the formation of a layer of surface blockage.

Placement of polymer-filled devices in this configuration renders a significant amount of surface area exposure of the textile material outer envelope of the devices to the feed stream as it passes through the container, providing contaminants in the feed stream with numerous contact points. As contaminants come in contact with the outer envelope of each of these devices, the textile material portion of the polymer-filled devices may dispersively conduct contaminants under capillary attraction throughout the interior of the devices for absorption and solidification by the polymer material. Consolidation points 56 and 57 in the stratified array of polymer-filled devices further provide for migration of contaminants under capillary attraction throughout the textile material portion of the uniform stratified arrangement of polymer-filled devices.

Other arrangements of polymer-filled devices that provide consolidation points for migration of contaminants under capillary attraction throughout an array of polymer-filled devices and establish flow channels that allow a feed stream to pass through the arrangement and inhibit the formation of a layer of surface blockage may be utilized.

In accordance with the first embodiment of the present invention directed to a method and apparatus for separating contaminants from fluid columns, each stratified polymer-filled device measures 12"×6"×½". Each stratified chamber of the device contains preferably 30 grams by weight of the solidifying polymer for a preferable total weight of 150 grams of polymer in the device. The textile material is preferably a petro-chemical based fabric, such as polypropylene. The polymer material is preferably an elastomer polymer sold under the trademark Waste-Set 3200, Waste-Set 3400, Nochar A610, Nochar A650, Enviro-Bond 403, Norsorex APX1, H-100 Environmental Spill Encapsulant or an equivalent.

Figure 6:
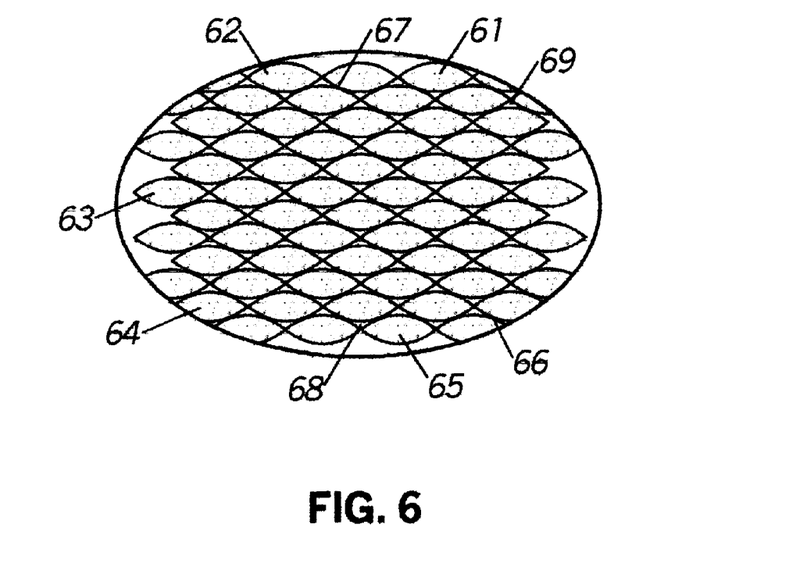
FIG. 6 shows a plurality of individual polymer-filled bags placed in a substantially coplanar stratified arrangement to provide a layer of polymer-based filtration media within a filter container.

As shown in FIG. 6, a plurality of individual polymer-filled bags 61, 62, 63, 64 and 65 may be placed in a substantially coplanar stratified arrangement to provide a layer of polymer-based filtration media within a filter container. The coplanar stratified arrangement creates a series of consolidation points of substantially equal surface area 66 and 67 of the stratified layers of polymer-filled bags and creates a series of flow channels of substantially equal cross-sectional area 68 and 69. These flow channels, located in areas where the polymer-filled bags do not come in contact with each other, allow a feed stream to pass through the stratified arrangement and inhibit the formation of a layer of surface blockage.

This configuration provides numerous contact points and significant surface area exposure of the textile material envelope of the polymer-filled bags with contaminants in a feed stream as it passes through the flow channels of the stratified arrangement. As contaminants come in contact with a polymer-filled bag, the textile material portion of the device may dispersively conduct contaminants under capillary attraction for absorption and solidification by the distinct chamber of polymer sealed within the bag. Consolidation points 66 and 67 of the stratified layers of polymer-filled bags further provide for the migration of contaminants under capillary attraction throughout the textile material portion of the array of polymer-filled bags.

Other arrangements of polymer-filled bags that provide consolidation points for migration of contaminants under capillary attraction throughout the textile material portion of an array of polymer-filled bags and establish flow channels that allow a feed stream to pass through the arrangement and inhibit the formation of a layer of surface blockage may be utilized.

In accordance with the second embodiment of the present invention directed to a method and apparatus for separating contaminants from fluid columns, each individual polymer-filled bag contains preferably 12 grams by weight of the solidifying polymer material within a single layer envelope of 1.0 ounce textile material measuring 4.25"×2.75". The textile material is preferably a petro-chemical based fabric such as polypropylene. The polymer material is preferably an elastomer polymer sold under the trademark Waste-Set 3200, Waste-Set 3400, Nochar A610, Nochar A650, Enviro-Bond 403, Norsorex APX1, H-100 Environmental Spill Encapsulant or an equivalent.

Figure 7:
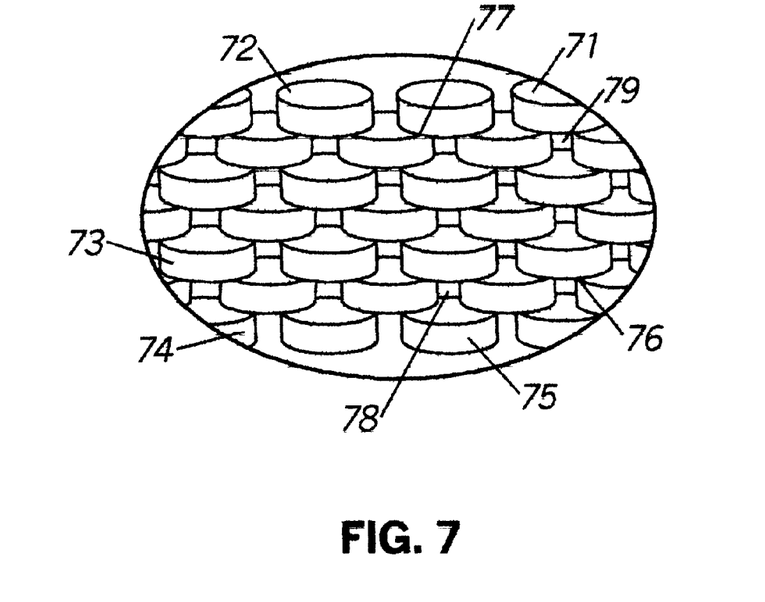
FIG. 7 shows a plurality of disk-shaped devices comprised of an agglomeration of solidifying polymer and binding agents placed in a substantially coplanar stratified arrangement to provide a layer of polymer-based filtration media within a filter container.

As shown in FIG. 7, a plurality of polymer-based filtration devices 71, 72, 73, 74 and 75 may be placed in a substantially coplanar stratified arrangement to provide a layer of polymer-based filtration media within a filter container. Each device may be comprised of an agglomeration of solidifying polymer and binding agents that has been formed into a disk. The coplanar stratified arrangement creates a series of consolidation points of substantially equal surface area 76 and 77 of the stratified layers of polymer-based agglomeration disks and creates a series of flow channels of substantially equal cross-sectional area 78 and 79. These flow channels, located in areas where the disks do not come in contact with each other, allow a feed stream to pass through the stratified arrangement and inhibit the formation of a layer of surface blockage.

This configuration renders a significant amount of surface area exposure of the polymer-based agglomeration to the feed stream as it passes through the container. Contaminants coming in contact with the devices may be dispersively conducted via capillary attraction throughout the interior of the disks for absorption and solidification. Consolidation points 76 and 77 in the stratified layers of agglomeration disks further provide for the migration of contaminants under capillary attraction throughout the arrangement of disks.

Other arrangements of polymer-based agglomeration disks that provide consolidation points for migration of contaminants under capillary attraction throughout the arrangement of the polymer-based disks and establish flow channels that allow a feed stream to pass through an array of agglomeration devices and inhibit the formation of a layer of surface blockage may be utilized.

In accordance with the third embodiment of the present invention directed to a method and apparatus for separating contaminants from fluid columns, a polymer=based agglomeration may utilize an elastomer polymer combined with binding agents that may be formed into a disk. Each disk may preferably measure 3" in diameter by ⅞" thick and have a total weight of 40 grams. Other suitable configurations of the agglomeration may be utilized to imbibe and solidify contaminants. The FiberTech Group of Landisville, N.J. is a known manufacturer of polymer=based agglomeration products.

Figure 8:
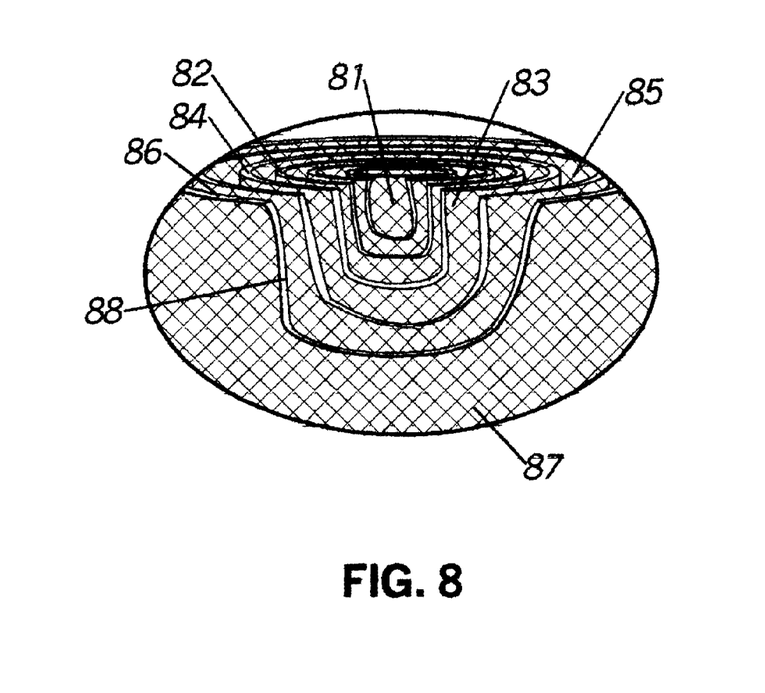
FIG. 8 shows a plurality of layers of a solidifying fabric arranged in a nested array to provide a layer of polymer-based filtration media within a filter container.

FIG. 8 is an illustration of a nested array of solidifying fabric 82, 84 and 88 arranged to form of a layer of polymer-based filtration media. Layers of lattice-like coalescing mesh material 81 and 87 may be placed between each layer of solidifying fabric in the nested array. The resulting arrangement of alternate layers of coalescing mesh material and solidifying textile material provides maximum surface area contact of contaminants in the fluid column with the solidifying fabric and establishes a series of flow channels 83, 85 and 86 between the layers of solidifying fabric.

Coalescing layers 81 and 87 provide for the consolidation of smaller contaminant droplets into larger droplets that are more readily sorbed by the solidifying fabric. These layers further serve to establish and define flow channels through the array of solidifying fabric. As a fluid column comes in contact with the textile material portion of the solidifying fabric, the web of non-woven textile filaments may dispersively conduct contaminants via capillary attraction throughout the nested array of solidifying fabric for absorption and solidification by the polymer in the fabric.

Other arrangements of solidifying fabric that allows for the migration of contaminants under capillary attraction throughout a nested array of solidifying fabric and establish flow channels that inhibit the formation of a layer of surface blockage while allowing the feed stream to pass through the array of solidifying fabric may be utilized.

In accordance with the fourth embodiment of the present invention directed to a method and apparatus for separating contaminants from fluid columns, a layer of solidifying fabric measuring approximately 36"×36" may be comprised of 268 grams by weight of the solidifying polymer and 113.5 grams by weight of a textile material, preferably a petrochemical based fabric such as polypropylene having a density of 2 ounces per square yard. The polymer material is preferably an elastomer polymer sold under the trademark Waste-Set 3200, Waste-Set 3400, Nochar A610, Nochar A650, Enviro-Bond 403, Norsorex APX1, H-100 Environmental Spill Encapsulant or an equivalent. A solidifying fabric sold under the trademark LAMINIT, or an equivalent, may be utilized.

Blending solidifying polymer with absorbing, adsorbing or coalescing materials may provide a polymer-based filtration media having similar properties to that of previously disclosed embodiments utilizing solidifying polymer and textile material or an agglomeration of polymer material and binding agents. Also, a polymer-based agglomeration may be granulated to a desired screen size and blended with other types of material to provide a polymer-based filtration media.

Figure 9:
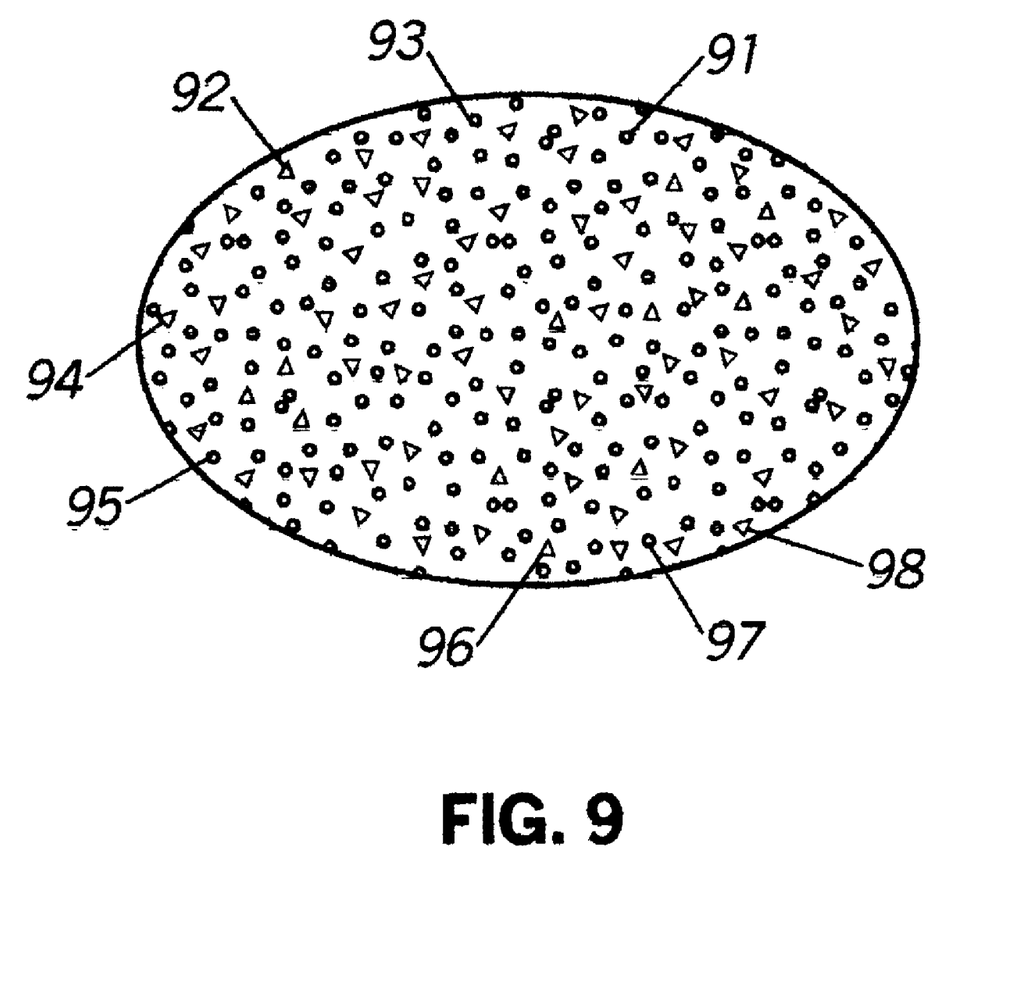
FIG. 9 shows a blend of the solidifying polymer and other filtration material to provide a layer of polymer-based filtration media within a filter container.

As shown in FIG. 9, combining solidifying polymer 91, 93, 95 and 97 with non-solidifying materials 92, 94, 96 and 98 in a homogeneous blend provides a fluid column with multiple contact points and extensive surface area exposure to the solidifying polymer. Non-solidifying components of the blend may enhance the ability of the media to extract contaminants from a fluid column via their absorbing, adsorbing or coalescing properties, retaining contaminants within the blended filtration media until it can be imbibed and solidified by the polymer.

The ratio of solidifying polymer to non-solidifying components may be such that the blended filtration media will serve to inhibit the formation of a layer of surface blockage as the solidifying polymer reaches its capacity for uptake of contaminants, allowing a fluid column to pass through the spent layer of filtration media.

In accordance with the fifth embodiment of the present invention directed to a method and apparatus for separating contaminants from fluid columns, the preferable blend of polymer and other types of filtration materials to provide one gallon of a polymer-based filtration media may be comprised of a mixture of one-half gallon of solidifying polymer and one-half gallon of other filtration materials, preferably substances such as polypropylene pellets or activated carbon. The polymer material is preferably an elastomer polymer sold under the trademark Waste-Set 3200, Waste-Set 3400, Nochar A610, Nochar A650, Enviro-Bond 403, Norsorex APX1, H-100 Environmental Spill Encapsulant or an equivalent. A blended mixture of solidifying polymer and activated carbon sold under the trademark Nochar A620, or an equivalent, may also be utilized.

Various embodiments of polymer-based filtration media and coalescing material may be placed within a filter container to allow each component of the stratified arrangement to be sized and configured to meet the requirements of a broad range of applications. Criteria utilized in producing such filter containers may include the volume and contamination level of a feed stream to be processed, composition and viscosity of contaminants in the feed stream, operating temperatures, desired flow rates and permitted discharge limits.

Identical embodiments of a polymer-based filtration media may be utilized to form stratified layers within a filter container, or a variety of embodiments may be utilized within a filter container. For example, a fluid column may initially encounter a layer of stratified individual polymer-filled bags with the next layer of polymer-based filtration media being a layer of solidifying polymer blended with activated carbon. A subsequent layer of polymer-based filtration media may be comprised of a nested array of solidifying textile material. Other combinations and embodiments of a polymer-based filtration media may be utilized.

A combination of the various embodiments may be utilized to provide a layer of the polymer-based filtration media. A variety of stratified arrangements may be utilized to achieve the desired results when treating specific feed stocks. Layers of non-polymer-based filtration media, such as activated carbon, may be placed within a filter container to remove contaminants from a fluid column that may not be extracted by the polymer-based filtration media. Filter containers may be utilized in an in-line and/or manifold configuration to achieve desired flow rates and discharge levels. The size and shape of filter containers may be varied to meet specific application requirements.

Spent polymer-based filtration media may allow a feed stream to pass through a filter container after the media reaches its capacity for uptake of contaminants. Spent polymer-based filtration media, along with coalescing layers and open-spaced chambers, provide for the coalescing of small contaminant droplets into larger, more readily recoverable contaminant droplets that may collect at the upper end of a filter housing once a filter container has reached its capacity for absorption and solidification of contaminants. In-an in-line configuration of multiple filter housings, it may be advantageous to vent the upper end of the initial filter housing to a bulk separation unit utilized in the initial stage of a separation system for recovery and recycling of the accumulated contaminants. Such an arrangement may serve to prolong the life of filter containers in subsequent filter housings of the in-line configuration, and further serve to dissipate pressure in the system.

Filter containers of polymer-based filtration media may be utilized to compliment other types of filtration systems. For example, the present method may be utilized to extract contaminants from seawater prior to processing it in a reverse osmosis unit, resulting in a more efficient utilization of the desalination equipment.

A filter container may be incorporated into a system in a fixed location or placed on a skid or pallet, allowing it to be transported to a remote location to treat a contaminated feed stream. A system of this type may be utilized in a variety of situations where discharge limits are of prime concern. When utilized as a component of a closed loop water filtration system, such as a pressure washing operation, water run-off generated during the operation of the system may continuously be captured, cleansed and recycled, providing an excellent water conservation opportunity. Similar closed loop systems may be utilized to treat rinse water used in systems designed to extract pollutants from contaminated soil. Accumulated water may be treated on site, then released into the environment, thereby eliminating its transportation to another location for processing and discharge.

Other candidate feed streams for use of this method include, but are not limited to, bilge water of marine vessels; water run-off at petrochemical plants, pipeline pump stations, airports, electric utility substations, locomotive and truck maintenance facilities; condensate generated by air compressors, pipeline pumps and similar devices; waste streams generated in pressure testing of annular conduits in petrochemical plants and pipelines; run-off from offshore petrochemical exploration and production platforms and spill remediation at marine, aviation, rail and other fuel terminals.

The method may further be used to treat water trapped in fuel tank storage vaults located beneath the concrete pads of automobile service stations; exhaust columns generated during dry cleaning and spray painting operations and the vapor-phase discharge of pipeline dehydration operations.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments which fall within the scope of the invention.

What is claimed is:

1. A method of removing, containing and collecting contaminants from a fluid column, comprising the steps of:

providing a filter housing defining a fluid impervious boundary wall with an inner surface and having inlet and outlet ports;

providing a filter container unit defining a fluid impervious boundary wall with an outer surface and having a fluid entry port and a fluid discharge port;

providing a plurality of volumes of polymer-based filtration media, each volume comprising an amount of a polymer material, said polymer having a property of acting to absorb and solidify contaminants coming into contact with the polymer-based filtration media, the polymer-based filtration media establishing distinct chambers of contaminant absorption units;

placing said plurality of volumes of polymer-based filtration media in a stratified arrangement within said filter container unit such that the distinct chambers of contaminant absorption units are oriented along planes and in distinct layers;

inserting the filter container unit into the filter housing so as to form a cavity between the inner wall surface of the filter housing and the outer wall surface of the filter container unit;

introducing a feed stream of contaminants carried within a fluid column to the inlet port of the filter housing to establish a flow of the fluid column carrying the contaminants to the fluid entry port of the filter container unit;

directing the flow entering the fluid entry port of the filter container unit to pass through the filter container along a path extending through and substantially orthogonal to each distinct layer of absorption units; and discharging as a processed feed stream the fluid exiting from the outlet port of the filter housing for release into the environment.

2. The method according to claim 1 further comprising the steps of:

removing the filter container of spent polymer-based filtration media containing solidified contaminants from the housing;

placing a filter container of fresh polymer-based filtration media having a capacity to absorb and solidify contaminants into the housing; and disposing of the solidified contaminants.

3. A method according to claim 1 wherein the polymer material component of the polymer-based filtration media is an elastomer polymer.

4. A method according to claim 1 wherein said volumes of polymer-based filtration media are arranged within the filter container to create flow channels therethrough.

5. A method according to claim 1 wherein said volumes of polymer-based filtration media are arranged within the filter container in a stratified array between layers of coalescing material and open-spaced fluid consolidation chambers.

6. An apparatus for removing, containing, and collecting contaminants from a fluid column, comprising:
- a filter housing defining a fluid impervious boundary wall with an inner surface and having at least one inlet port for receiving a feed stream of contaminants carried within a fluid column and at least one outlet port for discharging, as a processed feed stream, a fluid column from the housing for release into the environment; and
- a replaceable filter container unit defining a fluid impervious boundary wall with an outer surface and having a fluid entry port and a fluid discharge port, said filter container being disposed in the filter housing and having a plurality of volumes of a polymer-based filtration media arranged in stratification within the container to establish chambers of distinct contaminant absorption units oriented along planes and in distinct layers, said polymer having a property of acting to absorb and solidify contaminants coming into contact therewith.

7. The apparatus of claim 6 wherein the polymer-based filtration media is comprised of an outer envelope layer of textile material having a plurality of stacked layers of textile material disposed within the envelope and forming a plurality of chambers in stratification with a polymer material having the property of absorbing and solidifying liquid hydrocarbons being disposed in each of the chambers, and a seam joinder of the envelope and the stacked layers wherein said plurality of stacked textile material layers dispersively conduct liquid hydrocarbons under capillary attraction throughout the interior of said envelope for absorption and solidification by said polymer.

8. The apparatus of claim 7 wherein the stacked layers are arranged in a substantially coplanar array to establish flow channels therethrough.

9. The apparatus of claim 6 wherein said polymer-based filtration media comprise of a plurality of stacked layers of individual polymer-filled bags, each bag having with a seam joinder of the peripheries of the outer envelope layer to seal the polymer within the envelope and promote migration of organic compounds under capillary attraction throughout the envelope of the device.

10. The apparatus of claim 9 wherein the stacked layers of bags are arranged in a substantially coplanar array to establish flow channels therethrough.

11. The apparatus of claim 6 wherein the polymer-based filtration media comprises an agglomeration of polymer material and binding agents formed into disks.

12. The apparatus of claim 11 wherein the disks are stacked in a substantially coplanar array to establish flow channels therethrough.

13. The apparatus of claim 6 wherein the polymer-based filtration media comprises stacked layers of a solidifying fabric comprised of a textile material and a solidifying polymer.

14. The apparatus of claim 13 wherein the stacked layers of solidifying fabric are arranged in a nested array to establish flow channels therethrough.

15. The apparatus of claim 6 wherein the polymer-based filtration media comprises a blend of the polymer material and absorbent materials.

16. The apparatus of claim 15 wherein the polymer-based filtration media is arranged within the filter container to establish flow channels therethrough.

17. The apparatus of claim 6 wherein the polymer-based filtration media is arranged within the filter container to establish flow channels therethrough.

18. The apparatus of claim 6 wherein the polymer-based filtration media comprises a blend of the polymer material and coalescing materials.

19. The apparatus of claim 18 wherein the polymer-based filtration media is arranged within the filter container to establish flow channels therethrough.

20. The apparatus of claim 6 further comprising a plurality of layers of coalescing material within said filter container and wherein said volumes of polymer-based filtration media are arranged within the filter container in a stratified array between layers of coalescing material.

21. The apparatus of claim 6 wherein said filter container has at least first and second open-spaced fluid consolidation chambers and wherein said volumes of polymer-based filtration media are disposed between said open-spaced fluid consolidation chambers.

22. The apparatus of claim 6 further comprising structural stabilizing segments disposed within the stratified arrangement of filtration media to maintain alignment of the stratified layers within the filter container.

23. The apparatus of claim 22 wherein said structural stabilizing segments are arranged in a substantially perpendicular orientation to the direction of flow through a filter container.

24. The apparatus of claim 22 wherein said structural stabilizing segments contain a pattern of perforations to allow a feed stream to pass through the filter container and provide an even distribution and equitable surface area exposure of the feed stream to the layers of polymer-based filtration media.

25. The apparatus of claim 22 wherein a gasket comprised of a stratified arrangement of tubular polymer-filled envelopes is placed within the filter container between a structural stabilizing segment and the filter container, said polymer filled envelopes being joined along their periphery by a consolidating seam to place volumes of polymer in substantial registration with each other.

26. The apparatus of claim 6 further comprising a structural stabilizing column disposed within a filter container in a substantially parallel orientation to the direction of flow through the container.

27. The apparatus of claim 26 wherein said structural stabilizing column is tubular and allows a fluid column to pass through its interior.

28. The apparatus of claim 27 wherein volumes of polymer-based filtration media are arranged within said tubular structural stabilizing column to create flow channels therethrough.

29. The apparatus of claim 27 wherein said volumes of polymer-based filtration media are arranged within said tubular structural stabilizing column in a stratified array between layers of coalescing material and open-spaced fluid consolidation chambers.

30. A replacement cartridge for use in a system operating to process a fluid column to remove and collect contaminants therefrom, said system including a filter housing defining a fluid impervious boundary wall and having inlet and outlet ports, comprising:
- a filter container unit defining an impervious boundary wall and having inlet and outlet ports;
- a plurality of volumes of polymer-based filtration media arranged within the filter container, each volume comprising an amount of a polymer material, said polymer having a property of acting to absorb and solidify contaminants coming into contact with the polymer-based filtration media, the polymer-based filtration media establishing distinct chambers of contaminant absorption units; and said polymer-based filtration media being in a stratified arrangement within said filter container unit such that distinct chambers of contaminant absorption units are oriented along planes and in distinct layers.

31. The apparatus of claim 30 wherein the polymer-based filtration media is comprised of an outer envelope layer of textile material having a plurality of stacked layers of textile material disposed within the envelope and forming a plurality of chambers in stratification with a polymer material having the property of absorbing and solidifying liquid hydrocarbons being disposed in each of the chambers, and a seam joiner of the envelope and the stacked layers wherein said plurality of stacked textile material layers dispersively conduct liquid hydrocarbons under capillary attraction throughout the interior of said envelope for absorption and solidification by said polymer.

32. The apparatus of claim 31 wherein the stacked layers are arranged in a substantially coplanar array to establish flow channels therethrough.

33. The apparatus of claim 30 wherein said polymer-based filtration media comprise of a plurality of stacked layers of individual polymer-filled bags, each bag having with a seam joiner of the peripheries of the outer envelope layer to seal the polymer within the envelope and promote migration of organic compounds under capillary attraction throughout the envelope of the device.

34. The apparatus of claim 33 wherein the stacked layers of bags are arranged in a substantially coplanar array to establish flow channels therethrough.

35. The apparatus of claim 30 wherein the polymer-based filtration media comprises an agglomeration of polymer material and binding agents formed into disks.

36. The apparatus of claim 35 wherein the disks are stacked in a substantially coplanar array to establish flow channels therethrough.

37. The apparatus of claim 30 wherein the polymer-based filtration media comprises stacked layers of a solidifying fabric comprised of a textile material and a solidifying polymer.

38. The apparatus of claim 37 wherein the stacked layers of solidifying fabric are arranged in a nested array to establish flow channels therethrough.

39. The apparatus of claim 30 wherein the polymer-based filtration media comprises a blend of the polymer material and absorbent materials.

40. The apparatus of claim 39 wherein the polymer-based filtration media is arranged within the filter container to establish flow channels therethrough.

41. The apparatus of claim 30 wherein the polymer-based filtration media is arranged within the filter container to establish flow channels therethrough.

42. The apparatus of claim 30 wherein the polymer-based filtration media comprises a blend of the polymer material and coalescing materials.

43. The apparatus of claim 42 wherein the polymer-based filtration media is arranged within the filter container to establish flow channels therethrough.

44. The apparatus of claim 30 further comprising a plurality of layers of coalescing material within said filter container and wherein said volumes of polymer-based filtration media are arranged within the filter container in a stratified array between layers of coalescing material.

45. The apparatus of claim 30 wherein said filter container has at least first and second open-spaced fluid consolidation chambers and wherein said volumes of polymer-based filtration media are disposed between said open-spaced fluid consolidation chambers.

46. The apparatus of claim 30 further comprising structural stabilizing segments disposed within the stratified arrangement of filtration media to maintain alignment of the stratified layers within the filter container.

47. The apparatus of claim 46 wherein said structural stabilizing segments are arranged in a substantially perpendicular orientation to the direction of flow through a filter container.

48. The apparatus of claim 46 wherein said structural stabilizing segments contain a pattern of perforations to allow a feed stream to pass through the filter container and provide an even distribution and equitable surface area exposure of the feed stream to the layers of polymer-based filtration media.

49. The apparatus of claim 46 wherein a gasket comprised of a stratified arrangement of tubular polymer-filled envelopes is placed within the filter container between a structural stabilizing segment and the filter container, said polymer filled envelopes being joined along their periphery by a consolidating seam to place volumes of polymer in substantial registration with each other.

50. The apparatus of claim 30 further comprising a structural stabilizing column disposed within a filter container in a substantially parallel orientation to the direction of flow through the container.

51. The apparatus of claim 50 wherein said structural stabilizing column is tubular and allows a fluid column to pass through its interior.

52. The apparatus of claim 50 wherein volumes of polymer-based filtration media are arranged within said tubular structural stabilizing column to create flow channels therethrough.

53. The apparatus of claim 50 wherein said volumes of polymer-based filtration media are arranged within said tubular structural stabilizing column in a stratified array between layers of coalescing material and open-spaced fluid consolidation chambers.

* * * * *